UNITED STATES PATENT OFFICE.

VICTOR MORITZ GOLDSCHMIDT AND OYSTEIN RAVNER, OF CHRISTIANIA, NORWAY, ASSIGNORS TO DET NORSKE AKTIESELSKAB FOR ELEKTROKEMISK INDUSTRI OF NORWAY, OF CHRISTIANIA, NORWAY.

PROCESS OF PRODUCING ALUMINA FROM CLAY AND SIMILAR MATERIALS.

1,357,089.     Specification of Letters Patent.     Patented Oct. 26, 1920.

No Drawing.     Application filed December 23, 1918. Serial No. 268,082.

*To all whom it may concern:*

Be it known that we, VICTOR MORITZ GOLDSCHMIDT and OYSTEIN RAVNER, subjects of Norway, and residents of Christiania, respectively, in the Kingdom of Norway, have invented certain new and useful Improvements in Processes of Producing Alumina from Clay and Similar Materials, of which the following is a specification.

This invention relates to the production of pure $Al_2O_3$ and has for its object a method whereby this product by a simple procedure may be obtained from clay, kaolin and similar materials by a treatment with nitric acid.

Several methods have been suggested for the decomposition of clay, kaolin and bauxite by means of sulfuric acid, gaseous HCl and Cl.

We have found, however, that much better results may be obtained by using nitric acid as a decomposing agent. Nitric acid has not heretofore been used for this purpose, because a comparatively high temperature is required for the decomposition, so high that the nitric acid itself will decompose thus occasioning an increased cost in the process of manufacture. Further, clay and kaolin are only decomposed to a small extent by boiling with nitric acid, even when an excess is used.

According to our invention these difficulties may however be avoided. We have found that the above mentioned raw materials, clay and kaolin and also halloysite, marl, shale, etc., when heated to red heat, for example 500° C., become very easily soluble even in dilute nitric acid. The iron contained in the raw material is only slightly soluble in the acid.

This result may be explained as follows: The aluminium silicate originally present in the raw material is decomposed by the heating process so as to form uncombined amorphous $Al_2O_3$, which is comparatively easily soluble, while silicic acid and iron oxids, if present, are practically insoluble in nitric acid.

According to above described process, consisting in subjecting the raw material in question to calcination at a red heat and subsequent lixiviation with nitric acid, solutions of aluminium nitrate very poor in iron are obtained, which may be further treated according to known methods in order to recover $Al_2O_3$ therefrom. Instead of using nitric acid in the lixiviation process, nitrous gases and water may be employed and this equivalence is intended to be covered by the claims hereof.

In the following a specific illustration of our invention is given.

A Danish kaolin was calcined at a temperature of 500° C. It then contained 42.21% $Al_2O_3$ and 1.30% $Fe_2O_3$. The kaolin was boiled for two hours with 30% nitric acid and the solution obtained was separated from the residue by means of filtration. An analysis showed that 85% of the $Al_2O_3$ and 48.5% of the $Fe_2O_3$ of the kaolin had been dissolved. The solution was evaporated to dryness and the nitrates were calcined. This resulted in the formation of $Al_2O_3$ and nitrous gases which were used for the production of nitric acid according to known methods.

For a comparison a sample of the same kaolin was dried at 100° C. and then boiled with 30% nitric acid for two hours. The kaolin contained after drying: 37.81% $Al_2O_3$ and 1.13% $Fe_2O_3$. An analysis of the solution showed that only 15% of the $Al_2O_3$ and 9% of the $Fe_2O_3$ had been dissolved.

Similar results were obtained with various samples of English, Bohemian and German kaolin.

We have found that the favorable results obtained according to our method may be improved by a slight modification of the procedure. If the calcination of the raw material is carried out in a reducing atmosphere, for example in the presence of CO, the $Fe_2O_3$ present will wholly or partly be transformed to $Fe_3O_4$ which is not attacked by dilute nitric acid. Thus if our process is modified in this manner, the solution obtained will contain practically no iron.

It is to be understood that our invention is not limited to above described treatment of the nitrate solution. The recovery of $Al_2O_3$ from this solution may also be carried out by percipitation with ammonia or according to other well known methods.

The foregoing detailed description has been given for clearness of understanding and no undue limitation should be deduced therefrom, but the appended claims should be construed as broadly as permissible in view of the prior art.

What we claim as new and desire to secure by Letters Patent of the United States is:

1. The process of producing alumina which consists in heating an aluminous material to a red heat, lixiviating the calcined material with nitric acid thereby dissolving alumina and forming an aluminium nitrate solution and converting said aluminium nitrate to alumina.

2. The process of producing alumina which consists in heating kaolin thus to a red heat, lixiviating the kaolin with nitric acid thereby dissolving alumina and forming an aluminium nitrate solution, and converting said aluminium nitrate to alumina.

3. The process of producing alumina which consists in heating an aluminous material to a red heat, boiling the calcined material with nitric acid thereby dissolving alumina and forming an aluminium nitrate solution, and converting said aluminium nitrate to alumina.

4. The process of producing alumina which consists in heating an aluminous material to a red heat, boiling the calcined material with about 30% nitric acid thereby dissolving alumina and forming an aluminium nitrate solution, and converting said aluminium nitrate to alumina.

5. The process of producing alumina which consists in heating an aluminous material to about 500° C., boiling the calcined material with about 30% nitric acid thereby dissolving alumina and forming an aluminium nitrate solution, and converting said aluminium nitrate to alumina.

6. The process of producing alumina which consists in heating an aluminous material to a red heat, boiling the calcined material with about 30% nitric acid thereby dissolving alumina and forming an aluminium nitrate solution, evaporating said solution to dryness and calcining the nitrate, thereby forming alumina and nitrous gases.

7. The process of producing alumina which consists in heating kaolin thus treated to a red heat, boiling the kaolin thus treated with about 30% nitric acid thereby dissolving alumina and forming an aluminium nitrate solution, evaporating said solution, to dryness and calcining the nitrate, thereby obtaining alumina and nitrous gases.

8. The process of producing alumina which consists in heating an aluminous material to a red heat in a reducing atmosphere, boiling the said material thus treated with nitric acid thereby dissolving alumina and forming an aluminium nitrate solution, and converting said aluminium nitrate to alumina.

9. The process of producing alumina which consists in heating an aluminous material to a red heat in a reducing atmosphere, boiling the said material thus treated with about 30% nitric acid thereby dissolving alumina and forming an aluminium nitrate solution evaporating said solution, to dryness and calcining the aluminium nitrate, thereby obtaining alumina and nitrous gases.

10. The process of producing alumina which consists in heating kaolin to a red heat in a reducing atmosphere, boiling the kaolin thus treated with about 30% nitric acid, thereby dissolving alumina and forming an aluminium nitrate solution evaporating said solution, to dryness and calcining the nitrate, thereby obtaining alumina and nitrous gases.

11. The process of producing alumina free from iron from an aluminous material containing iron, which comprises calcining the said material to a red heat in a reducing atmosphere, lixiviating the resultant product with nitric acid whereby a solution of aluminium nitrate is formed the iron oxids remaining undecomposed, and converting the said aluminium nitrate to alumina.

12. The process of producing alumina free from iron from an aluminous material containing iron, which comprises heating the said material to about 500° C. in a reducing atmosphere, lixiviating the resultant product with about 30% nitric acid whereby a solution of aluminium nitrate is formed the iron oxids remaining undecomposed, evaporating the said solution to dryness and calcining the said aluminium nitrate, thereby forming alumina and nitrous gases.

Signed at Christiania, Norway, on this 7th day of November, 1918.

VICTOR MORITZ GOLDSCHMIDT.
OYSTEIN RAVNER.